United States Patent
Millen et al.

(10) Patent No.: US 7,707,766 B2
(45) Date of Patent: May 4, 2010

(54) DEVICE AND METHOD FOR CASTING

(76) Inventors: Brian W. Millen, 19 Nursery Rd., Titusville, NJ (US) 08560; Brian W. Millen, Jr., 19 Nursery Rd., Titusville, NJ (US) 08560

( * ) Notice: Subject to any disclaimer, the term of this patent is extended or adjusted under 35 U.S.C. 154(b) by 0 days.

(21) Appl. No.: 11/724,479

(22) Filed: Mar. 15, 2007

(65) Prior Publication Data
US 2007/0214708 A1   Sep. 20, 2007

Related U.S. Application Data

(60) Provisional application No. 60/782,563, filed on Mar. 15, 2006.

(51) Int. Cl.
*A01K 87/08*   (2006.01)
*A01K 97/10*   (2006.01)

(52) U.S. Cl. ............... 43/23; 43/21.2; 43/25; 16/110.1; 16/421; 16/422; 16/426; 16/430

(58) Field of Classification Search ............ 43/23, 43/21.2, 25; 16/110.1, 413, 421, 422, 426, 16/427, 429, 430
See application file for complete search history.

(56) References Cited

U.S. PATENT DOCUMENTS

| | | | | | |
|---|---|---|---|---|---|
| 774,143 | A | * | 11/1904 | Adams | 43/25 |
| 834,571 | A | * | 10/1906 | Galbraith | 43/25 |
| 1,198,202 | A | * | 9/1916 | Drinkard | 43/21.2 |
| 1,761,497 | A | * | 6/1930 | Smith | 224/922 |
| 1,883,041 | A | * | 10/1932 | Somers | 43/25 |
| 2,085,654 | A | * | 6/1937 | Harris | 43/25 |
| 2,116,158 | A | * | 5/1938 | Pontis | 43/23 |
| 2,144,876 | A | * | 1/1939 | Garnett | 43/21.2 |
| 2,146,350 | A | * | 2/1939 | Roberts | 43/25 |
| 2,149,837 | A | * | 3/1939 | Browne | 43/23 |
| 2,158,104 | A | * | 5/1939 | Bowen | 43/25 |
| 2,212,212 | A | * | 8/1940 | Planitz | 43/25 |
| 2,244,408 | A | * | 6/1941 | Thompson | 43/25 |
| 2,272,010 | A | * | 2/1942 | Kerkam | 43/25 |
| 2,292,142 | A | * | 8/1942 | Matson | 43/23 |
| 2,443,946 | A | * | 6/1948 | Bozorth, Jr. | 43/25 |
| 2,482,192 | A | * | 9/1949 | MacDonald | 43/25 |
| 2,522,624 | A | * | 9/1950 | Lochen | 43/23 |
| 2,526,981 | A | * | 10/1950 | Von Beck | 43/21.2 |
| 2,653,406 | A | * | 9/1953 | Grabiak et al. | 43/25 |
| 2,685,755 | A | * | 8/1954 | Gorenflo | 43/23 |
| 2,714,272 | A | * | 8/1955 | Tuttle | 43/25 |
| 2,761,236 | A | * | 9/1956 | Gaston | 43/25 |

(Continued)

FOREIGN PATENT DOCUMENTS

GB    2039701 A   *   8/1980

(Continued)

*Primary Examiner*—Darren W Ark

(57) ABSTRACT

A device for coupling to a fishing rod includes a handle which includes a member with an aperture for receiving a reel seat of a rod and an arm extending from the member comprising a grip for receiving one or more digits is provided. A device may also include a handle, which includes a cylindrical member for coupling onto a rod, an arm extending from the member and disposed at a selected angle thereto, where the arm includes a grip for receiving one or more digits. Methods for using the devices and coupling to a user to repetitively make desired casting movements are also provided.

7 Claims, 8 Drawing Sheets

U.S. PATENT DOCUMENTS

| | | | | | |
|---|---|---|---|---|---|
| 2,804,711 | A | * | 9/1957 | Kozar | 43/25 |
| 2,810,982 | A | * | 10/1957 | Bucciarelli | 43/25 |
| 2,826,852 | A | * | 3/1958 | Wardrip | 43/23 |
| 2,869,276 | A | * | 1/1959 | Hagen | 43/25 |
| 3,010,242 | A | * | 11/1961 | Emanuel | 43/21.2 |
| 3,029,543 | A | * | 4/1962 | Budd | 43/25 |
| 3,045,380 | A | * | 7/1962 | Meredith | 43/25 |
| 3,154,274 | A | * | 10/1964 | Hillcourt | 43/21.2 |
| 3,159,939 | A | * | 12/1964 | Transeau | 43/21.2 |
| 3,296,732 | A | * | 1/1967 | Magnus | 43/23 |
| 3,367,056 | A | * | 2/1968 | Johnson | 43/25 |
| 3,372,509 | A | * | 3/1968 | Arsenault | 43/21.2 |
| 3,372,510 | A | * | 3/1968 | Arsenault | 43/21.2 |
| 3,410,016 | A | * | 11/1968 | Arsenault | 43/21.2 |
| 4,014,129 | A | * | 3/1977 | Capra | 43/23 |
| 4,041,635 | A | * | 8/1977 | Savage | 43/25 |
| 4,190,977 | A | * | 3/1980 | Casper | 43/21.2 |
| 4,453,332 | A | * | 6/1984 | Wightman | 43/23 |
| 4,519,159 | A | * | 5/1985 | Fazio | 43/25 |
| 4,559,735 | A | * | 12/1985 | Batick, Jr. | 43/21.2 |
| 4,628,628 | A | * | 12/1986 | Burgin et al. | 43/21.2 |
| 4,651,461 | A | * | 3/1987 | Williams | 43/23 |
| 4,697,377 | A | * | 10/1987 | Martin | 43/23 |
| 4,701,142 | A | * | 10/1987 | Merritt | 440/101 |
| 4,796,373 | A | * | 1/1989 | Struntz | 43/23 |
| 4,858,365 | A | * | 8/1989 | Struntz | 43/23 |
| 4,876,980 | A | * | 10/1989 | Bell, III | 43/21.2 |
| 5,127,182 | A | * | 7/1992 | Hutchings et al. | 43/25 |
| 5,159,775 | A | * | 11/1992 | Sutula, Jr. | 43/21.2 |
| 5,212,900 | A | * | 5/1993 | Perry | 43/21.2 |
| 5,237,770 | A | * | 8/1993 | Creek | 43/23 |
| 5,313,735 | A | * | 5/1994 | Latouche | 43/25 |
| 5,319,995 | A | * | 6/1994 | Huang | 74/551.8 |
| 5,325,620 | A | * | 7/1994 | Reed et al. | 43/21.2 |
| 5,363,586 | A | * | 11/1994 | Balkenbush | 43/23 |
| D353,262 | S | * | 12/1994 | Cantavespre et al. | D22/148 |
| 5,390,438 | A | * | 2/1995 | Warren, Jr. | 43/23 |
| 5,421,117 | A | * | 6/1995 | Geraci et al. | 43/21.2 |
| 5,426,884 | A | * | 6/1995 | Makowsky | 43/25 |
| 5,511,293 | A | * | 4/1996 | Hubbard et al. | 43/25 |
| 5,564,217 | A | * | 10/1996 | Riedell | 43/23 |
| 5,581,931 | A | * | 12/1996 | Swisher | 43/21.2 |
| 5,910,004 | A | * | 6/1999 | Antosh | 43/21.2 |
| 5,941,012 | A | * | 8/1999 | Dominguez | 43/21.2 |
| 6,065,240 | A | * | 5/2000 | Paddock | 43/21.2 |
| 6,067,741 | A | * | 5/2000 | Eaton | 43/23 |
| 6,237,274 | B1 | * | 5/2001 | Head et al. | 43/25 |
| D447,534 | S | * | 9/2001 | Wackowski et al. | D22/147 |
| 6,295,755 | B1 | * | 10/2001 | Macaluso | 43/25 |
| 6,347,477 | B1 | * | 2/2002 | Hopper | 43/21.2 |
| 6,493,982 | B1 | * | 12/2002 | Macaluso | 43/25 |
| 6,557,292 | B1 | * | 5/2003 | Howard | 43/21.2 |
| 6,631,866 | B1 | * | 10/2003 | Obrink et al. | 242/390.8 |
| 6,705,041 | B2 | * | 3/2004 | Hays | 43/25 |
| 6,729,064 | B2 | * | 5/2004 | Congialosi | 43/21.2 |
| 6,748,691 | B2 | * | 6/2004 | Doucette | 43/25 |
| 6,763,628 | B1 | * | 7/2004 | Bartlett | 43/23 |
| 6,918,202 | B2 | * | 7/2005 | Merritt | 43/4 |
| 7,124,536 | B2 | * | 10/2006 | Harkey | 43/21.2 |
| 7,444,777 | B2 | * | 11/2008 | Keys et al. | 43/23 |
| 7,533,485 | B2 | * | 5/2009 | Nyland | 43/25 |
| 7,594,354 | B1 | * | 9/2009 | Chadwick | 43/21.2 |
| 2002/0104193 | A1 | * | 8/2002 | Warashina et al. | 16/422 |
| 2002/0152669 | A1 | * | 10/2002 | Harvanek | 43/21.2 |
| 2003/0051315 | A1 | * | 3/2003 | Lau | 16/422 |
| 2004/0163214 | A1 | * | 8/2004 | Cheng | 16/426 |
| 2005/0257416 | A1 | * | 11/2005 | Nyland | 43/21.2 |
| 2005/0279008 | A1 | * | 12/2005 | Hernandez | 43/21.2 |
| 2006/0086033 | A1 | * | 4/2006 | Barrett | 43/23 |
| 2006/0101702 | A1 | * | 5/2006 | LaCoste | 43/21.2 |
| 2006/0112521 | A1 | * | 6/2006 | Moshenrose | 16/430 |
| 2006/0201049 | A1 | * | 9/2006 | Nyland | 43/21.2 |
| 2007/0000165 | A1 | * | 1/2007 | Nyland | 43/21.2 |
| 2007/0056144 | A1 | * | 3/2007 | Vidal | 16/430 |
| 2007/0204435 | A1 | * | 9/2007 | Pangborn | 16/430 |
| 2007/0289101 | A1 | * | 12/2007 | Casteel et al. | 16/422 |
| 2008/0028665 | A1 | * | 2/2008 | Barrett | 43/23 |
| 2009/0013584 | A1 | * | 1/2009 | Selfors | 43/23 |
| 2009/0113782 | A1 | * | 5/2009 | Driggers | 43/23 |
| 2009/0241408 | A1 | * | 10/2009 | Newton | 43/25 |

FOREIGN PATENT DOCUMENTS

| | | | | |
|---|---|---|---|---|
| GB | 2048633 | A | * | 12/1980 |
| GB | 2123675 | A | * | 2/1984 |
| GB | 2366989 | A | * | 3/2002 |
| JP | 05007445 | A | * | 1/1993 |
| JP | 05244849 | A | * | 9/1993 |
| JP | 2000209997 | A | * | 8/2000 |
| JP | 2000224947 | A | * | 8/2000 |
| JP | 2002306040 | A | * | 10/2002 |
| JP | 2006197858 | A | * | 8/2006 |
| JP | 2007159428 | A | * | 6/2007 |

* cited by examiner

DEVICE AND METHOD FOR CASTING

CROSS-REFERENCE TO RELATED APPLICATIONS

This application claims priority under 35 U.S.C. §119(e) from U.S. Provisional Application No. 60/782,563, filed on Mar. 15, 2006, the entire disclosure of which is hereby incorporated herein.

FIELD OF THE INVENTION

The invention relates generally to fishing devices and methods, and more particularly, to devices for fishing rods and methods for casting a fishing rod using a device.

BACKGROUND INFORMATION

Fly fishing is a form of sport fishing and may also be considered an art. Other forms of fishing include bait or spin casting. In bait or spin casting, the lure is thrown and the line goes along with the lure, whereas in fly casting, the line is thrown and the lure goes along with the line.

A fly cast is made by executing the rod to move the entire length of line backwards and forwards to be cast in the air in a forward direction using the rod to deliver the line and a fly at the terminal portion thereof to the water. In typical fly casting, the casts may be between twenty and sixty feet in length.

It is more difficult to learn to cast a fly line than to use a spinning reel and rod. The skills applicable to spin casting do not apply to fly casting and may also be counterproductive to learning the art. The proper cast of a fly rod may also be counterintuitive, leading many to pursue other types of fishing instead.

A fly rod is typically longer than a bait or spin casting rod. To an extent, the weight and speed of the line is used to throw the line, but it is the loading and unloading of the rod that is used to impart speed and a wave motion to the line. The speed and wave motion increase the efficiency of the fly cast to a substantial distance with accuracy.

In fly casting, a basic motion is to cast the line back and forth in a straight line accelerating to a stop. An additional amount of line may be added while casting back and forth, until a suitable length is achieved. When a suitable amount of line is in motion, the cast is complete by allowing the line to fall to the water surface. The motion described above is one that must be mastered, although it is counterintuitive. The caster must learn the appropriate motions of the body and the rod so the tip of the rod moves through a very small arc at the appropriate time. By using the appropriate motions, speed, and power, the line goes backward and forward in a "tight loop" configuration. Making a movement in an inappropriate direction or decelerating to a stop at the inappropriate time results in an ineffective cast.

Although fly fishing is considerably more difficult than conventional casting, casting properly with a spinning rod and reel and other fishing rods also poses difficulties to any caster.

There remains a need for a device and method to assist the caster in casting fishing rods, including spinning and fly fishing rods.

SUMMARY OF THE INVENTION

Figure 1:
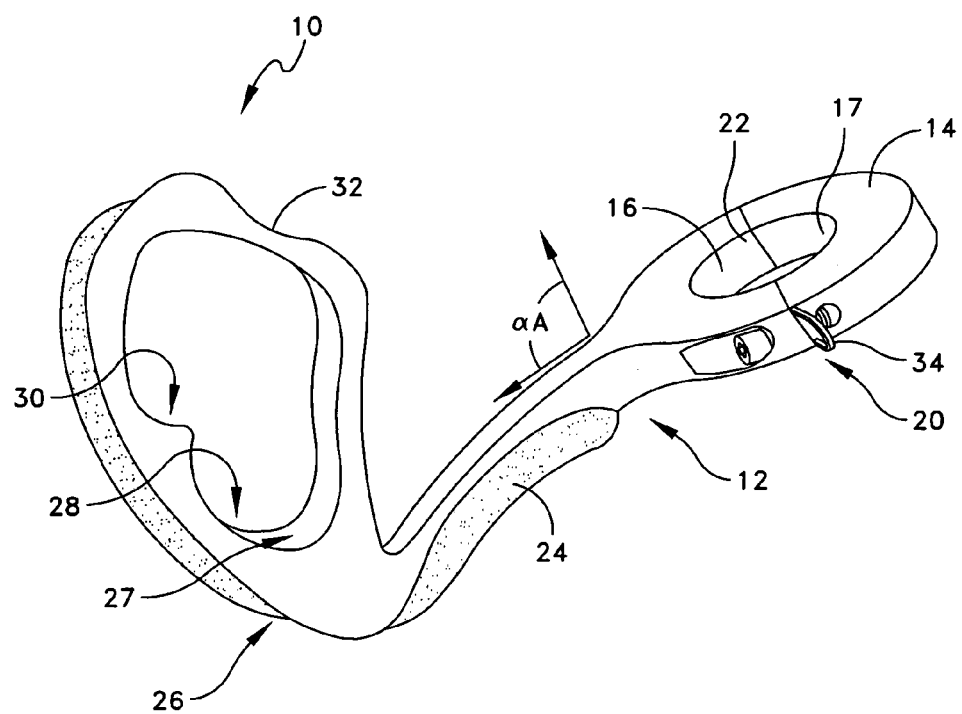
FIG. 1 illustrates an embodiment of a device according to an aspect of the invention.

Briefly described, a device for coupling to a fishing rod, according to an aspect of the invention includes a handle, which includes a member with an aperture for receiving a reel seat of a rod; and, an arm extending from the member comprising a grip for receiving one or more digits.

According to another aspect of the invention, a method for casting a fishing rod includes the steps of coupling a handle according to the above-described device to a rod and coupling the handle to a user with a wrist strap, where the user may cast the rod using the handle to make desired repetitive movements.

According to another aspect of the invention, a device for coupling to a fishing rod includes a handle, which includes a substantially cylindrical member for coupling onto a rod, an arm extending from the member and disposed at a selected angle thereto, where the arm includes a grip for receiving one or more digits.

In another aspect of the invention, a method for casting a fishing rod includes the steps of coupling a handle according to the above-described device to a rod and coupling the handle to a user with the forearm strap, where the user casts the rod using the handle and desired casting movements are repetitively made through the reciprocating movements of the rigid member.

DETAILED DESCRIPTION OF THE INVENTION

In one embodiment, a device for coupling to a fishing rod includes a handle, which includes a member with an aperture for receiving a reel seat of a rod; and, an arm extending from the member comprising a grip for receiving one or more digits. The handle may include a curved portion for conforming to the hip and/or thigh area of a user. The member and aperture may be substantially cylindrical. The arm may be disposed at a selected angle relative to the member. The arm may extend from the member in a first direction for a first selected distance and thereafter extend in a second direction for a second selected distance. The first direction may be approximately 90° relative to the member and the first selected distance may be approximately 4 inches. The second direction may be approximately 90° relative to the first direction and the second selected distance may be approximately 2 inches. The grip may include one or more curved portions for receiving one or more digits. The grip may further include an indentation for receiving an additional digit.

The member may further include a coupling device for receiving a wrist strap. The wrist strap may include an adjustable band for placing around a wrist. The wrist strap may further include a reciprocal coupling device for releasably coupling to the coupling device of the member. The reciprocal coupling device of the wrist strap is attached thereto with a selected length of cord. The selected length of cord may be approximately two inches. The reciprocal coupling device of the wrist strap may be coupled to the coupling device of the member. The coupling device may be in the form of a ring and the reciprocal coupling device may be in the form of a hook. The wrist strap may be formed from hook and loop material.

In another embodiment, a method for casting a fishing rod includes the steps of coupling a handle according to the above-described device to a rod and coupling the handle to a user with a wrist strap, where the user may cast the rod using the handle to make desired repetitive movements. The wrist strap prevents the wrist of a user from opening more than 45°.

In another embodiment, a device for coupling to a fishing rod includes a handle, which includes a substantially cylindrical member for coupling onto a rod, an arm extending from the member and disposed at a selected angle thereto, where the arm includes a grip for receiving one or more digits. The handle may include a curved portion for conforming to the hip and/or thigh area of a user. The arm may extend from the member in a first direction for a first selected distance and thereafter extend in a second direction for a second selected distance. The first direction may be approximately 90° relative to the member and the first selected distance may be approximately 4 inches. The second direction may be approximately 90° relative to the first direction and the second selected distance may be approximately 4 inches. The grip may include one or more indentations for receiving one or more digits.

The cylindrical member may further include an aperture adjacent the base thereof for receiving a rigid member. The rigid member may be coupled to a forearm strap. The forearm strap may include an adjustable band for placing around a forearm. The rigid member may further include a stop for coupling to the cylindrical member. The rigid member may be disposed through the aperture of the cylindrical member and the stop is disposed on the free end of the rigid member.

In another embodiment, a method for casting a fishing rod includes the steps of coupling a handle described above to a rod, and coupling the handle to a user with the forearm strap; wherein the user casts the rod using the handle and desired casting movements are repetitively made with more power and speed than one hand alone to achieve the necessary acceleration to a stop through the reciprocating movements of the rigid member. The rigid member prevents the wrist of a user from opening more than 45°.

As used herein, the terms "comprises", "comprising", "includes", "including", "has", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "or" refers to an inclusive "or" and not to an exclusive "or". For example, a condition A or B is satisfied by any one of the following: A is true (or present) and B is false (or not present); A is false (or not present) and B is true (or present); and both A and B are true (or present).

The terms "a" or "an" as used herein are to describe elements and components of the invention. This is done merely for convenience and to give a general sense of the invention. The description herein should be read to include one or at least one and the singular also includes the plural unless indicated to the contrary.

Unless otherwise defined, all technical and scientific terms used herein have the same meaning as commonly understood by one of ordinary skill in the art to which the invention belongs. Although methods and materials similar or equivalent to those described herein can be used in the practice or testing of the invention, suitable methods and materials are described below. In addition, the materials and methods are illustrative only and are not intended to be limiting. It is to be understood that the devices and methods used can vary and are not limited to the devices and methods described herein, as a skilled artisan will appreciate.

One of the differences between casting a fly rod and casting a spinning rod is the weight of the lure. A fly (lure) typically has considerably less weight than a lure, and, based on the weight, cannot be thrown very far. In contrast, the weight of a lure typically used on a spinning rod can be thrown almost as far as one is able to cast. Because of these differences in weight, the line on the fly rod is made thicker and heavier.

When casting a fly rod, the beginning of the cast is slow, but continues to accelerate in speed up to an abrupt stop at the end. The same principle applies to both the forward and backward cast. Using one hand to grip the rod while moving the line in repetitive forward and backward directions is one of the most difficult techniques associated with casting, as it is difficult to generate the speed needed while staying on an even and vertical plane for a successful cast.

Advantageously, it has been found that the addition of a device, according to an aspect of the invention, to a fishing rod and the methods for use thereof improves the casting ability of the caster by doubling the power and speed which in turn makes it much easier to achieve an acceleration to the stop by guiding arm movement through an appropriate casting motion. The device is designed for coupling or attaching to any commercially available fishing rod, and is made of inexpensive and lightweight materials.

Use of the device on any rod enables a caster to use both hands to enable the generation of speed needed to complete a successful cast. The caster uses the primary casting hand to hold the rod and reel. A second hand on the device, which is not burdened by the weight of rod or reel, provides more power to the cast. While not wishing to be bound by any theory, it is believed that the use of a second hand increases the power of the cast at least twofold. In addition, the device, including the handle and strap coupled thereto may be used by a right or left-handed person.

Lightweight materials are used for manufacturing the device so the weight does not interfere with or adversely affect the casting of the rod. Suitable materials include, but are not limited to, aluminum, graphite, stainless steel, higher-grade polycarbonate, fiberglass, titanium, wood, cork, and combinations thereof. As an example, the device may be made of a material that matches the composition of the rod. Alternatively, for example, the device may be manufactured entirely from 6061 grade aluminum, and may also include polycarbonate inserts on the outer surface of the grip to provide comfort to the caster and also to provide friction to prevent slippage. Alternatively, the device may be manufactured entirely from polycarbonate and the outer surface of the grip may have grids or other suitable markings integrally molded therein to provide friction. Many of the above-described materials are also inexpensive and readily available.

Referring now to the Figures, FIG. 1 illustrates an embodiment of a device 10 according to an aspect of the invention. The device 10 includes a handle 12. The handle 12 includes a member 14 with an aperture 16 for receiving a reel seat 18 of a rod 19 (illustrated in FIG. 3). The member 14 may be substantially cylindrical. The aperture 16 may be substantially cylindrical for receiving the reel seat 18.

Figure 2:
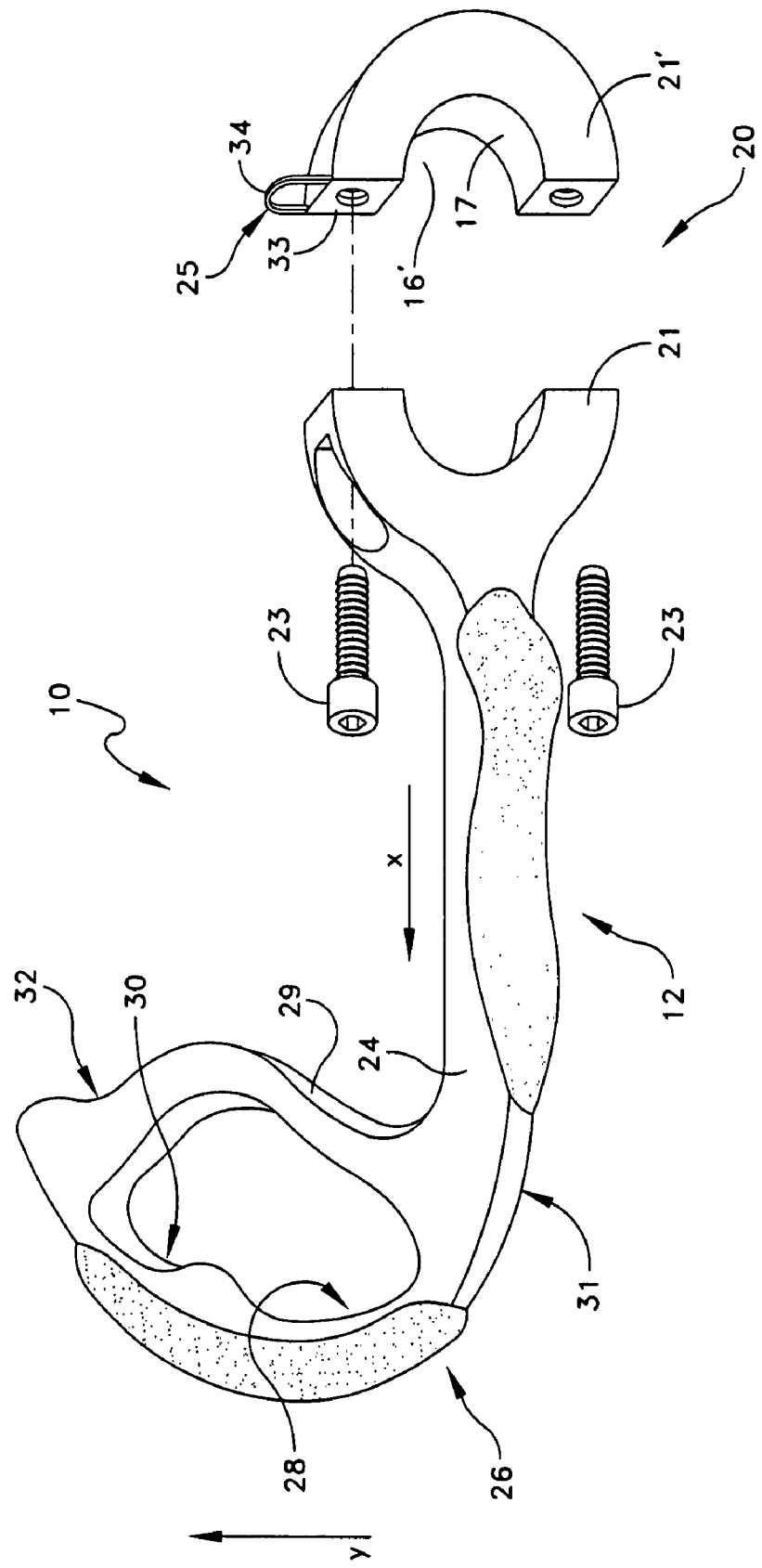
FIG. 2 is an exploded view of the embodiment illustrated in FIG. 1.

The reel seat 18 typically has a threaded male portion for which the aperture 16 is adapted to receive. Regardless of whether the male portion is threaded, a rubber grommet or shim 17 for coupling with the reel seat of the rod may be provided. A suitable member for receiving a rod 19 may be a clamping device 20 as illustrated in FIGS. 1 and 2. The aperture 16 of the member 14 may be coupled to a rod 19 by using bolts or screws 23 (or springs—not shown) to couple the two portions 21, 21' of the clamping device 20 together. Additional and alternative coupling devices are described below with regard to FIGS. 12a, 12b and 13.

An arm 24 extends from the member 14 and includes a grip 26. The interior surface 27 of the grip 26 for a full finger enclosure includes curved portions 28 and 30 for receiving one or more digits, for example, the ring and pinky fingers of a caster's hand. The exterior surface 29 of the grip 26 for a full finger enclosure may include an indentation 32 for receiving an additional digit, for example, the third finger of a caster's hand.

In this embodiment, the thumb and index finger are free to guide or toggle the fishing line, whether on a fly or spinning rod. The exterior surface 29 of the grip 26 also may include a curved portion 31 which fits into the caster's palm. The arm 24 may be disposed at a selected angle relative to the member 14 and to the rod 19. A suitable angle may be 90° from the member, illustrated as α-A in FIG. 1. With the device 10 coupled to a rod 19, the arm 24 may extend a selected length in a first direction X at a 90° angle relative to the rod, and extend a selected length in a second direction Y at a 90° angle relative to the first length (FIG. 2).

A suitable length for the arm 24 is approximately 4 inches, but may be more or less, depending upon the size of the rod 19, or the size of the hand of the user. The entire length of the handle 12 of the device 10 is approximately 4.5 inches, and the height is approximately 2.5 inches, but the dimensions are not limited thereto.

Although the arm 24 of the handle 12 is illustrated at a selected angle (α-A) relative to the member 14, it is to be understood that the handle 12 may be made, according to the spirit and scope of the invention as defined by the claims, in many different shapes and sizes. For example, the arm 24 may curve outwardly from the member 24: it is not limited to any particular geometry. Regardless of the geometry or shape of the arm 24, the grip 26 on the arm 24 should be suitable, however, for receiving one or more digits.

Figure 6:
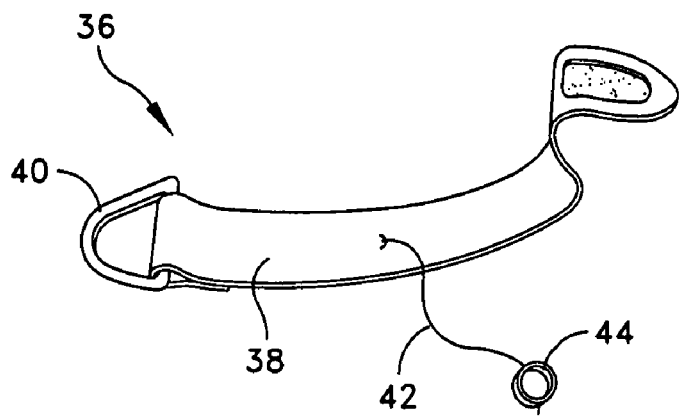
FIG. 6 illustrates a wrist strap according to an aspect of the invention.

The device 10 may also include on the member 14 of the handle 12 a coupling device 34 for receiving a wrist strap 36 (FIG. 6). The coupling device 34 as illustrated in FIG. 1 is in the form of a loop, eyelet, or ring, but alternative shapes and coupling devices 34 may also be suitably used. The coupling device 34 may be attached to the outer surface of the member (FIG. 1), or alternatively may include a plate 33 bolted between the clamping device portions 21, 21' with a loop 25 extending beyond the outer periphery of the member 14. A suitable clamping device 20 may include a two-bolt detachable plate 21 and 21' with a rubber or other suitable lining 17 for standard size rod handle diameters, and clamp screws (steel 20 t, ¼ inch) or bolts 23 for clamping the plates 21 and 21' of the device 20 together. Additional and alternative coupling devices are described below with regard to FIGS. 12a, 12b, and 13.

Figure 3:
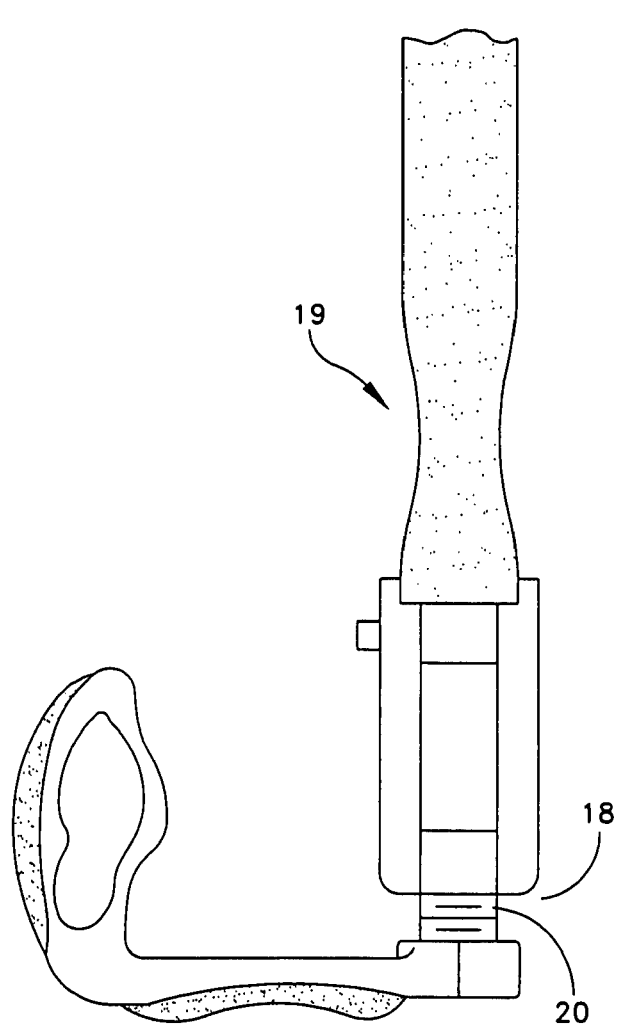
FIG. 3 illustrates the embodiment of FIG. 1 in context with the end of a fishing rod.
Figure 4:
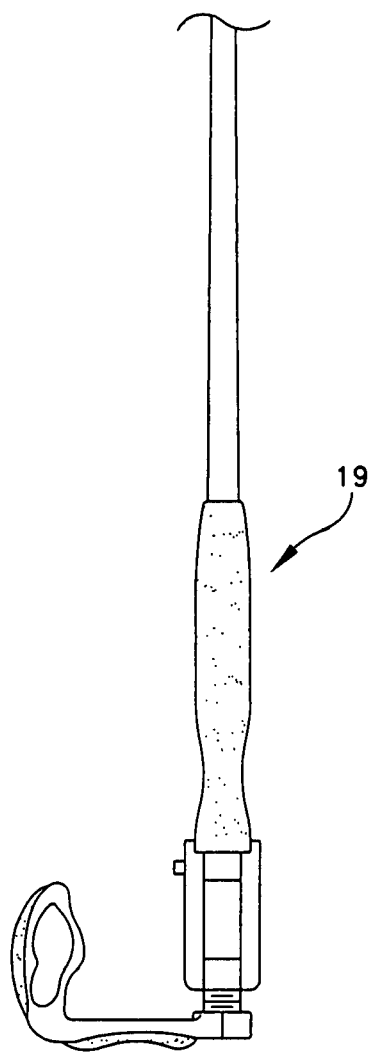
FIG. 4 illustrates the embodiment of FIG. 1 in context with a fishing rod.

The handle 12 is illustrated in FIGS. 3 and 4 in context of the end portion (and an entire) fishing rod. Although a fly rod is illustrated, it is to be understood that the device 10 according to the invention may also be used on a spinning rod, casting rod, or when spey fishing or saltwater fishing.

Figure 5:
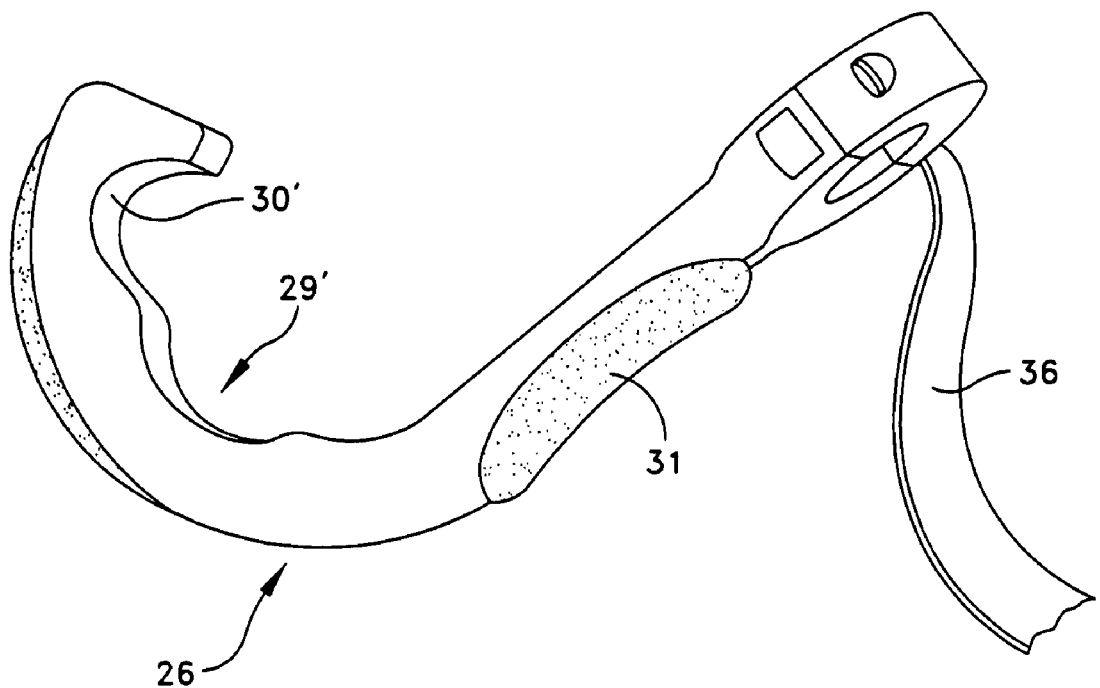
FIG. 5 illustrates an embodiment of the device according to another aspect of the invention.

Referring to FIG. 5, an alternative embodiment according to an aspect of the invention is illustrated. In FIG. 5, the grip 26 includes a curved portion 29' and 31' for receiving one or more digits of the caster's hand. In FIG. 5, the full finger enclosure is not included (as in FIG. 1).

Figure 14A:
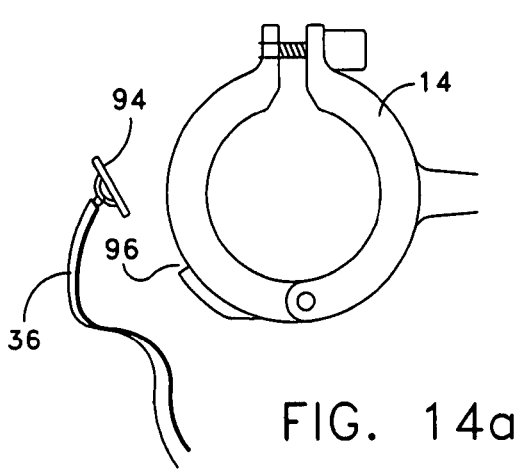
FIGS. 14a and 14b illustrate an embodiment according to another aspect of the invention for securing the wrist strap to the device.
Figure 14B:
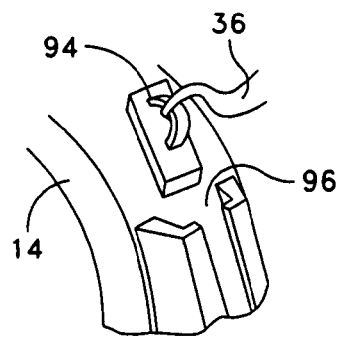

Referring to FIG. 6, wrist strap 36 is illustrated. The wrist strap 36 may include an adjustable band 38 for placing around a caster's wrist. The band 38 may be formed of a hook and loop material, for example VELCRO®, which can be easily adjusted to the size and shape of a wrist and secured by pulling the adjustable band 38 through a slotted portion 40 and applying pressure to the material. Suitable materials also may include leather, cotton, plastic or other conventional materials used in forming straps. The material selected for the strap should not be extensible when finally adjusted to fit the wrist, as the expansion of the material could interfere with desired casting movements. The wrist strap 36 may include a reciprocal coupling device 44 for releasably coupling to the coupling device 34 of the member 14. As illustrated, the reciprocal coupling device 44 is a ring or clasp, but may also include a hook, clip, and other suitable devices for easily coupling and decoupling. The coupling device 44 is attached to the strap 36 by a cord 42. An additional coupling device is illustrated in FIGS. 14a and 14b.

Cord 42 is made a suitable flexible and strong material, for example, nylon. The material should not be extensible, as the length of the cord 42 is intended to remain substantially the same, that is, the selected length of the cord 42 provides the caster with the ability to make repeated movements with the wrist in achieving perfect or nearly perfect casts. Repeated movements "teach" the muscles of the arm to make the same movements, and hence provide the muscles with "memory" to continue making the repeated desired casting movements.

To successfully cast a fly rod, one must abide by a series of rules and actions. The first important step in making a cast is to accelerate the rod backwards to an abrupt stop while moving the line and fly through the air. To do this with finesse requires speed, power and control, as a fly rod can be clumsy to use with its associated leverage and spring weight working against the caster. The second important step is to allow the line to unroll behind the caster before bringing the movement of the rod to an abrupt halt and accelerating to the fore position. This also requires control, in addition to the ability to perfectly position the rod in the fore and aft positions.

The device may advantageously be used in the following manner. The caster makes casting movements by moving the rod backwards and forwards (in a substantially vertical direction relative to the surface of the ground or water) with a sufficient amount of line extending from the end of the rod. Upon reaching sufficient speed in the line, which properly loads the rod, a cast is made onto the water. With one hand on the rod, and a second hand on the device, additional acceleration of the cast and additional control of the caster's ability to stop the cast is greatly improved. This is imperative for a good cast. The handle of the device allows the caster to use the non-dominant hand or arm to provide power and stability in the movement of the rod. When the device is used with the wrist strap coupled to the handle, the stopping of the cast is at the proper angle, which creates continuity and encourages good technique. It is in the extended position that the cord prevents the wrist of the caster from opening more than 45°. One can readily ascertain that the device is useful both for the novice and the seasoned caster.

Figures 7, 8:
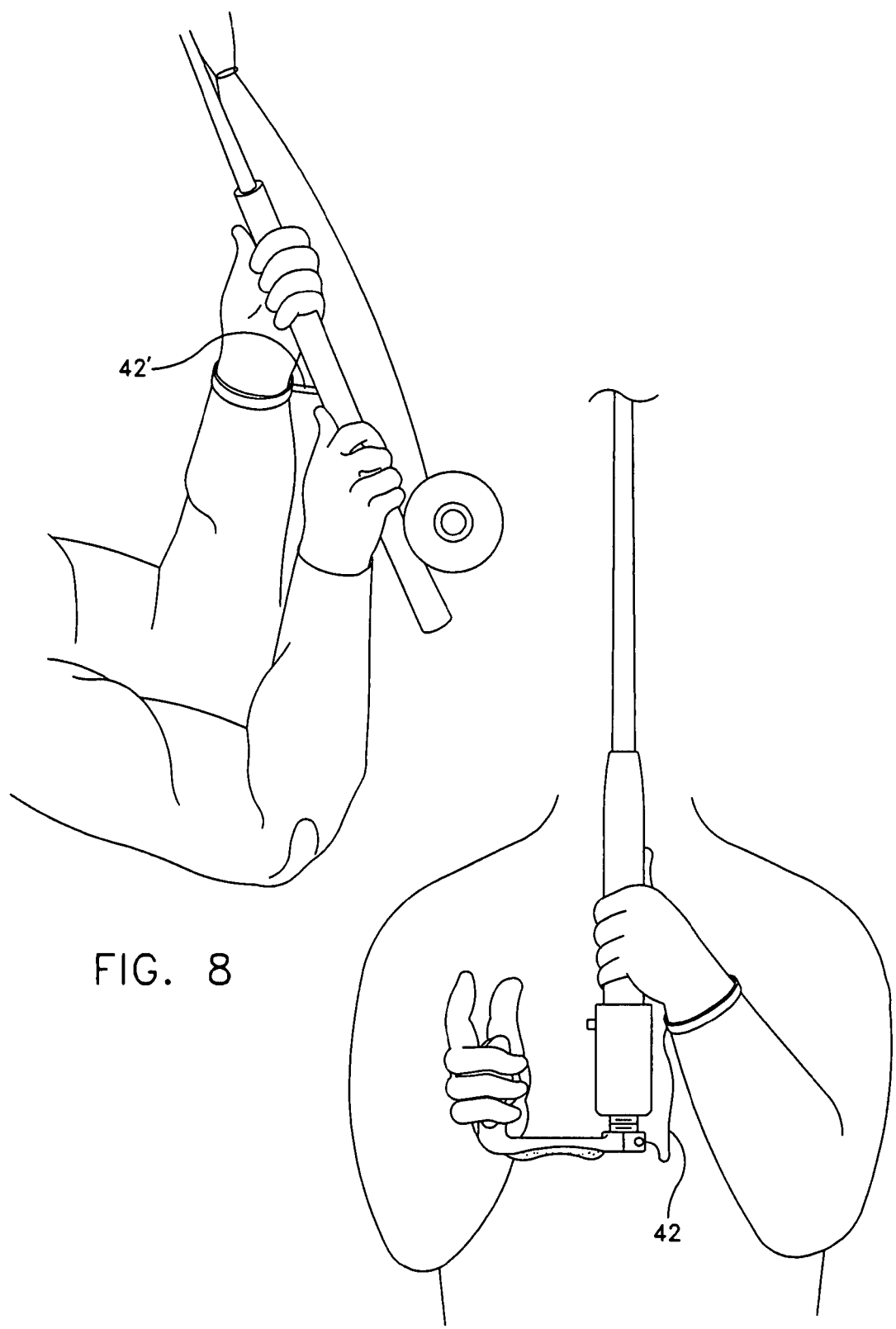
FIGS. 7 and 8 are front and side views, respectively, illustrating the embodiment of FIG. 1 in conjunction with FIG. 6 in context with a caster.

Referring to FIG. 7, a front view of a caster holding the handle 12 coupled to a rod 19 is illustrated. The cord 42 is illustrated in a collapsed position. Referring to FIG. 8, the cord 42' is illustrated in an extended position and is taut as the caster casts the line. While one hand is on the rod, the curved portion 31 of the handle 12 may be used as a leverage point for pushing and pulling the handle 12 with a second hand.

The extended cord 42' prevents (or teaches) the user from substantially deviating from the movement of the wrist in a further backward direction (more than 45°), which typically results in a bad cast. It is to be understood that a deviation of 5° in either direction will not likely result in a bad cast, but a further deviation of an additional 5° or more will likely result in an unacceptable cast. A suitable length of cord 42 is approximately 2 inches, but may be slightly longer or shorter in length, depending upon the needs of the user.

Figure 9:
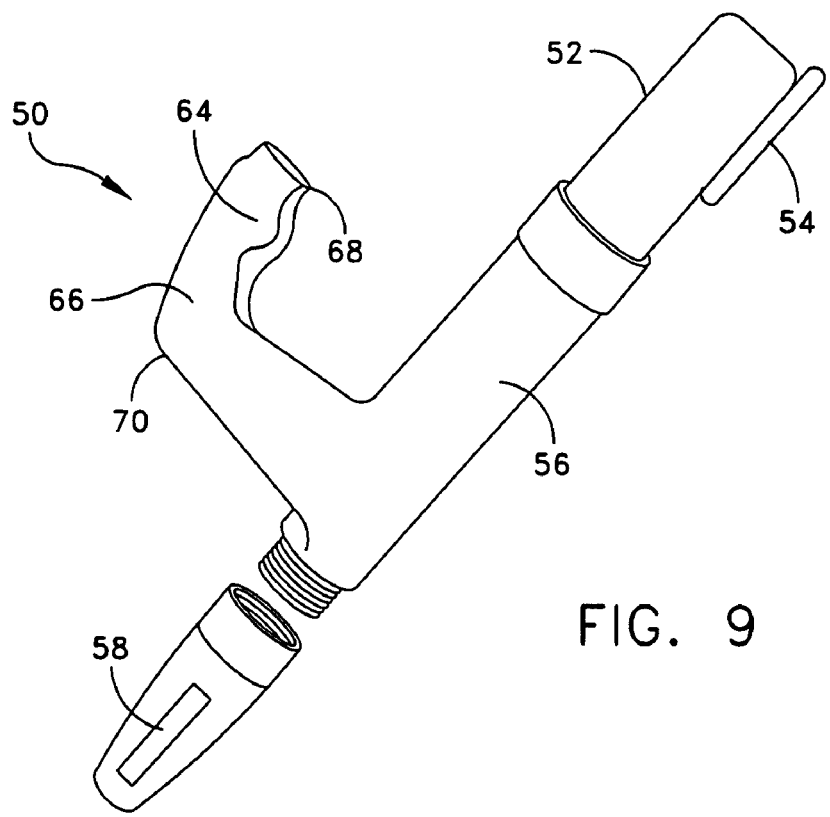
FIG. 9 illustrates an embodiment of a device according to another aspect of the invention.

FIG. 9 illustrates an embodiment of a device according to another aspect of the invention. In this embodiment, the device 50 attaches to the bottom or butt end of a rod 52 at a location below the reel 54. In this embodiment, the device 50 comprises a substantially cylindrical handle 56 for coupling with a rod 52. The handle 56 should be of sufficient size to accommodate any commercially-available rod, and may also be adjustable, depending upon the needs of the user. The handle 56 also includes an aperture 58 at the end thereof for receiving a rigid member 60.

Figure 10:
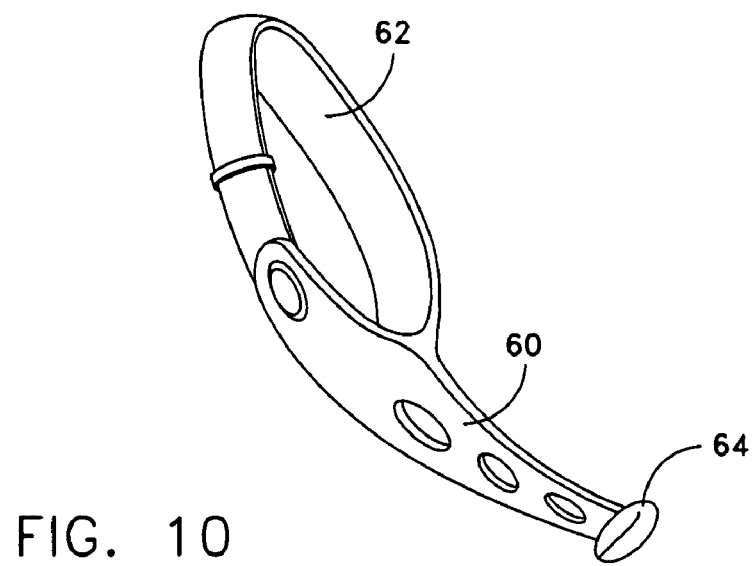
FIG. 10 illustrates a forearm strap according to an aspect of the invention.

Referring still to FIG. 9, the aperture 58 may be slotted to permit easy sliding of the rigid member 60 (illustrated in FIG. 10) through the aperture 58. A forearm strap 62 is suitably coupled to the rigid member 60 which prevents the wrist of the caster from opening more than 45° during a cast. The rigid member 60 may be made of but is not limited to aluminum, and may be made of another suitable material or combinations of materials. To prevent the rigid member 60 from slipping through the aperture 58, and to keep the rigid member slidably coupled to the handle 56, a suitable stop 64 is coupled to the end thereof.

The handle includes an arm 66 extending therefrom which includes one or more depressions 64 and 68 for receiving one or more fingers of a hand. The outer surface 70 of the arm 66 may also be curved to fit into the palm of the user. This embodiment allows the thumb, index, and middle finger to freely move and which remain available for controlling or guiding the fishing line.

Figure 11:
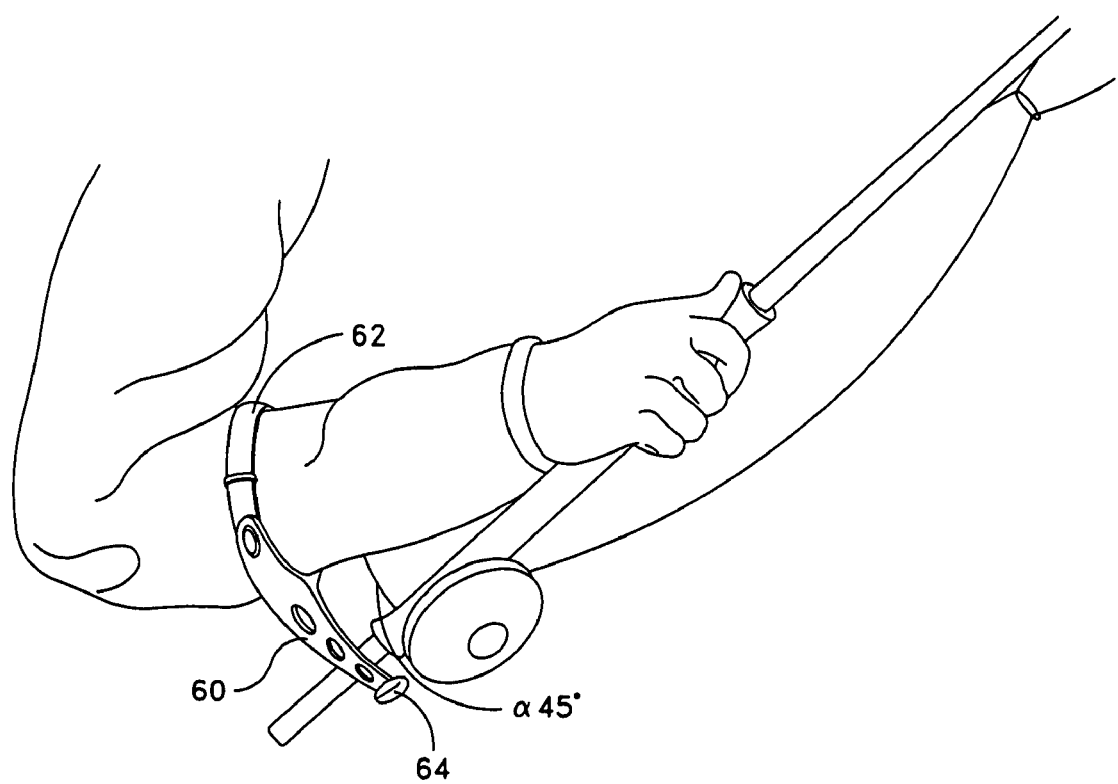
FIG. 11 illustrates the device of FIG. 9 in conjunction with the forearm strap of FIG. 10 in context with a caster.

FIG. 11 illustrates the device in use. One end of the rigid member 60 is disposed through aperture 58 and the opposite free end of the rigid member is attached to an adjustable strap 62 for placing about a forearm. The adjustable strap may be made of hook and pile material, for example, VELCRO®. When casting the line, the rigid member will slide reciprocally through the aperture 58. The rigid member 60 is a selected length to stop the cast at 45°.

Figure 12A:
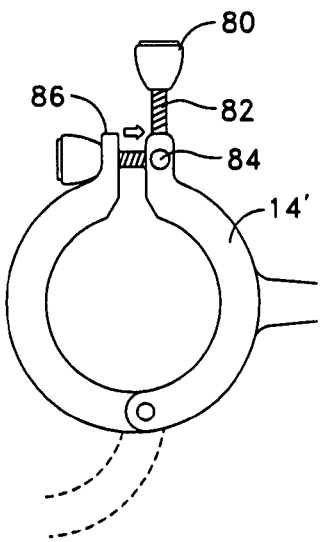
FIGS. 12a, 12b, and 13 illustrate alternative embodiments for securing the device to a rod according to another aspect of the invention.
Figure 12B:
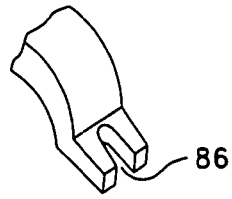
Figure 13:
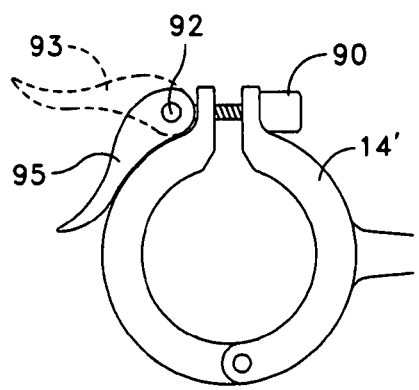

FIGS. 12a, 12b, and 13 illustrate alternative embodiments for coupling a device to a rod. In FIG. 12a, a locking knob 80 with a threaded rod 82 pivots on a hinge 84. In FIG. 12b, a cutaway portion indicated by dashed lines in FIG. 12a is illustrated. In FIG. 12a, a portion of the ring member 14' has a slotted portion 86 (FIG. 12b) for receiving the locking knob 80. In FIG. 13, an adjustment knob 90 is lockably engaged with a portion of the ring member 14' with a cam 92. The cam 92 may be easily moved in an upward position 93 (shown in phantom) to open the member 14' and in a downward position 95 to lock the member 14' around a rod 19.

FIGS. 14a and 14b illustrate an alternative embodiment for securing a wrist strap 36 to the member 14. The wrist strap 36 has a bar 94 for slidably engaging with an encasing slot 96 disposed on the member 14. The bar 94 easily inserts into the encasing slot 96 and may also be removed easily, but will not likely disengage from the slot 96 during use.

The devices according to the invention may also be used when fighting a fish. Once a fish is hooked on the line, the device can be rested on the thigh in the area adjacent the hip. This position helps to distribute the pressure, as with a conventional round fighting butt, but has a larger surface area to disperse the energy. When saltwater fishing, the handle may be placed under the arm and hooked onto the back thereof to increase leverage and to free the hands for stripping the line.

The invention has been described with reference to specific embodiments. One of ordinary skill in the art, however, appreciates that various modifications and changes can be made without departing from the scope of the invention as set forth in the claims. Accordingly, the specification and figures are to be regarded in an illustrative manner, rather than a restrictive view and all such modifications are intended to be included within the scope of the invention. For example, a fishing rod may be designed to include the handle according to an aspect of the invention during manufacture, and avoid the need to place a separate device on a rod. In this embodiment, the device, including at least the handle would be integrally incorporated and formed with the rod during manufacture thereof and result in a complete unit.

Benefits, other advantages, and solutions to problems have been described above with regard to specific embodiments. The benefits, advantages, solutions to problems and any element(s) that may cause any benefit, advantage, or solution to occur or become more pronounced are not to be construed as a critical, required, or essential feature or element of any or all of the claims.

What is claimed is:

1. A device for coupling to a fishing rod, said device comprising:
    a handle, the handle comprising:
        a member comprising a pair of semi-cylindrical clamping device portions defining therebetween a substantially cylindrical aperture for receiving a reel seat of a rod, said pair of clamping device portions being coupled to each other by at least one fastener extending through both of said pair of clamping device portions,
        a coupling device for receiving a wrist strap, said coupling device comprising a loop extending outwardly from a periphery of said member, and
        an arm having a first end at said member and extending from the member to a second end comprising a grip for receiving one or more digits of a user's hand; and
    a wrist strap coupled to the coupling device for preventing a wrist of a user from opening more than a desired amount, said wrist strap having a first end with a loop, a second end, a cord with a first end attached to the wrist strap and a second end with a reciprocal coupling device for releasably coupling to the coupling device of the member.

2. The device according to claim 1, wherein the arm is disposed at a selected angle relative to the member.

3. The device according to claim 1, wherein the grip comprises one or more curved portions for receiving one or more digits of a user's hand.

4. The device according to claim 3, wherein the grip further comprises an indentation for receiving an additional digit of a user's hand.

5. The device according to claim 1, wherein the member includes a curved portion for conforming to the hip and/or thigh area of a user.

6. The device according to claim 1, wherein the arm extends from the member in a first direction for a first selected distance and thereafter extends in a second direction for a second selected distance.

7. A method for casting a fishing rod, comprising the steps of:
- providing the device for coupling to a fishing rod of claim 1;
- coupling the handle to a fishing rod; and,
- coupling the handle to a user with the wrist strap; wherein the user casts the rod using the handle and desired movements are repetitively made.

* * * * *